United States Patent [19]

Sakamura et al.

[11] Patent Number: 5,132,898
[45] Date of Patent: Jul. 21, 1992

[54] IMPROVED SYSTEM FOR PROCESSING DATA HAVING DIFFERENT FORMATS

[75] Inventors: Ken Sakamura, Tokyo; Toyohiko Yoshida, Itami, both of Japan

[73] Assignee: Mitsubishi Denki Kabushiki Kaisha, Tokyo, Japan

[21] Appl. No.: 631,197

[22] Filed: Dec. 20, 1990

Related U.S. Application Data

[63] Continuation of Ser. No. 171,615, Mar. 11, 1988, abandoned.

[30] Foreign Application Priority Data

Sep. 30, 1987 [JP] Japan .................................. 62-246621

[51] Int. Cl.[5] .............................................. G06F 7/00
[52] U.S. Cl. .................................. 395/425; 564/259.8; 564/269.9
[58] Field of Search ... 364/200 MS File, 900 MS File

[56] References Cited

U.S. PATENT DOCUMENTS 4,433,377 2/1984 Eustis et al. ........................ 364/200

OTHER PUBLICATIONS

Kirrmann, H. IEEE Micro, Aug. 1983, pp. 32-47, "Data Format & Bus Compatability In Multiprocessors".

"MC68020 32-Bit Microprocessor User's Manual," Motorola Inc. 1984 pp. 1-3, 2-3, 5-4.

Cohen, D., Computer, vol. 14, #10, Oct. 1981, "On Holy Wars & A Plea For Peace", pp. 48-54.

Primary Examiner—Thomas M. Heckler
Attorney, Agent, or Firm—Townsend and Townsend

[57] ABSTRACT

A data processor that executes arithmetic operations between first and second binary numbers, stored in different registers, of different lengths, with the first number having a byte-length smaller than the register, and the second number having a byte-length equal to the register, by storing the first number so that its lower order bit is justified with the lower order bit of the second number. Additionally, data having different bit and byte polarities are processed by reversing the bit and byte order of the data as required.

21 Claims, 14 Drawing Sheets

Fig. 1
Prior Art
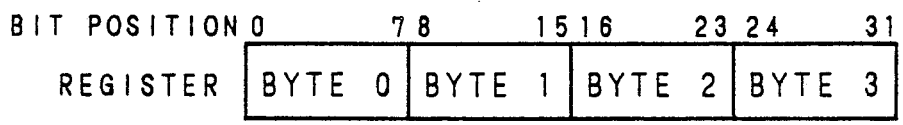
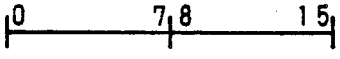
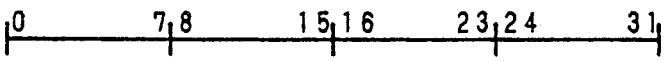
Fig. 2
Prior Art
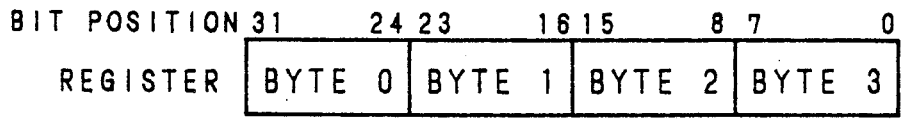
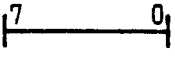
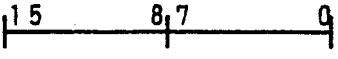
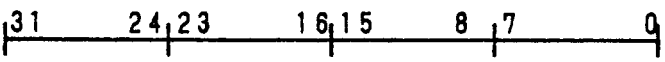

IMPROVED SYSTEM FOR PROCESSING DATA HAVING DIFFERENT FORMATS

This is a continuation of application Ser. No. 07/171,615 filed Mar. 11, 1988, now abandoned.

BACKGROUND OF THE INVENTION

1. Field of the Invention

The present invention relates generally to a data processor which carries out operations between operands having different sizes, that is, having different bit lengths of data, and, in more detail, to a data processing apparatus capable of arithmetic and bit operations between different-sized operands under an addressing system wherein the most significant bit of data is stored in a low address in a memory and the least significant bit thereof is stored in a high order address in the memory.

2. Description of the Prior Art

Many debates have been made so far on whether the high order side of data is to be located on the high order address side or to be located on the low order address side when locating the data in a memory wherein addresses are formatted on a byte basis, and include numbers showing order or placement of bits in a byte.

A method wherein the high order side of data is located at high order addresses of a memory and the low order side of the data is located at low order addresses of the memory is called little endian, and a method wherein the high order side of data is located at low order addresses of a memory and the low order side of the data is located at high order addresses of the memory is called big endian.

In the recent data processors, generally addresses of a memory is put on a byte basis with one byte consisting of 8 bits. However, in the case of handling a bit map display or a bit field whose bit length is not integer a, bit address showing the bit position in the byte is also required in addition to the byte address, and the concept of little endian and big endian exists also for the bit address. The byte polarity and the bit polarity showing that the byte and the bit are little endian or big endian are not always required to be coincident. Detailed description is made in "On Holy Wars and a Plea for Peace," by D. Cohen, Computer, Vol. 14, No. 10, Oct., 1981, pp. 48–54 on whether the little endian is better or the big endian is better or which has been adopted by the conventional data processors.

The problem of little endian and big endian exists not only for addresses of bytes and bits in memory but also exists for byte and bit positions in a register.

FIG. 1 shows an example wherein for storing data aligned with low order address side as same as the case of storing in memory, for the case where data whose byte length is shorter than the byte length of a register is stored in the register in a data processor whose both the byte polarity and the bit polarity are big endian.

In this case, the bit address indicating the bit position is the same irrespective of the data size in the register, but in the case where an arithmetic operation such as addition between binary number data having different data sizes stored in two registers is executed, a problem occurs because the least significant bits of both data are not coincident. In the arithmetic an operation, operation is required to be executed to make with the least significant bits of both data coincident, and in this case, the operation of arithmetically shifting the data having a shorter size in the right direction must be executed after direction.

When hardware executing this arithmetic shift is employed for a register input-output unit and an ALU input-out unit, a problem occurs the data processor requires more hardware and becomes larger. Also, there is another problem that the operation speed is lowered when an operation is executed by machine instructions or microprograms.

As shown in FIG. 2, the MC68000 Series microprocessor manufactured by Motorola, the U.S. avoids this problem by setting the byte polarity to big endian and the bit polarity to little endian. However, in this case, since the bit polarity differs from the byte polarity, it is required to reverse the order of address calculation of data when handling byte strings and bit string, and therefore there exists a problem that the load in designing software is increased.

By setting both the byte polarity and the bit polarity to little endian, the problem in the operation between different-sized operands is eliminated, but the problem peculiar to the little endian format when in handling BCD (Binary-Coded Decimal) numbers or string data remains. The problem peculiar to the little endian is detailed in the above-mentioned paper by D. Cohen.

Also, in the case where data processors having different byte polarities or different bit polarities are incorporated into the same system, a problem occurs that a linking bus between these processors is complicated. In addition, an example of linking data processors having different byte polarities or bit polarities is described in "Data Format and Bus Compatibility in Multiprocessors" by H. Kirrman," IEEE Micro, August 1983, pp. 32–47.

SUMMARY OF THE INVENTION

The present invention has been designed to solve the problems as mentioned above, and purposes to enable data having a byte length shorter than the byte length of a register holding the data to be processed with other data without arithmetic shift with both the byte polarity and the bit polarity set intact to big endian, and also purposes to obtain a data processor capable of easily changing the polarity of data so as to be able to also handle data for other data processors having different byte polarity or bit polarity.

A data processor in accordance with the present invention adopts the big endian for both the byte polarity and the bit polarity of data. Then, as shown in FIG. 3, in the case where data having a byte length smaller than the byte length of a register is stored in the register, data is the data stored is shifted in the register so that the least significant bit of the data is stored in the least significant bit position in the register.

Also, in the data processor in accordance with the present invention, when the register bit position of data stored in a register is designated by a bit number and data size number specified by an instruction. The same bit position number in the register is designated for a specified bit number, n, which is small than 8 when the specified data size is 8 bits and the specified bit number is n, when the specified data size is 16 bits and the specified bit number is n+8, and when the specified data size is 32 bits and the specified bit number is n+24.

Furthermore, the data processor in accordance with the present invention executes has an instruction which reverses the byte order of data of 4 bytes or 2 bytes, an instruction which reverses the bit order of data of 4 bytes, 2 bytes or 1 byte.

In the data processor of the present invention, data having a byte length shorter than the byte length of a register is stored in the register with the least significant bit coincided with that of data having the same byte length in another register, and thus, an arithmetic operation can be executed between two binary numbers having different data sizes stored in two registers without arithmetic shifting of either data.

Also, by determining the bit position of data in a register based on the data size and the bit number designated by instruction, the bit polarity of the data in the register is set to big endian.

Furthermore, by being provided with the instruction for reversing the byte order of data and the instruction for reversing the bit order of data, data having a format wherein either the byte polarity, the bit polarity differs, or both the differ can be easily converted into data having the a format of the byte polarity or the bit polarity which can be handled by the present data processor in accordance with the present invention.

The above and further objects and features of the invention will more fully be apparent from the following detailed description with accompanying drawings.

BRIEF DESCRIPTION OF THE DRAWINGS

FIG. 1 is a schematic diagram showing an example wherein data, having a byte length shorter than the byte length of a register, is stored in the register of a data processor having big endian byte and bit polarity with the stored disk aligned with the low order address side of the register.

FIG. 2 is a schematic diagram in the case where the byte polarity is set to big endian and the bit polarity is set to little endian.

DESCRIPTION OF THE PREFERRED EMBODIMENT

Hereinafter, description will be given on an embodiment in accordance with the present invention in reference to the drawings.

In addition, more detailed description is made on an apparatus in accordance with the present invention in the U.S. patent application Ser. No. 07/636,025 filed Aug. 20, 1990 which is a continuation of Ser. No. 07/173,501 filed Mar. 24, 1988 abandoned, titled "Data Processor" applied by one of inventors of the present patent application and the like.

Figure 4:
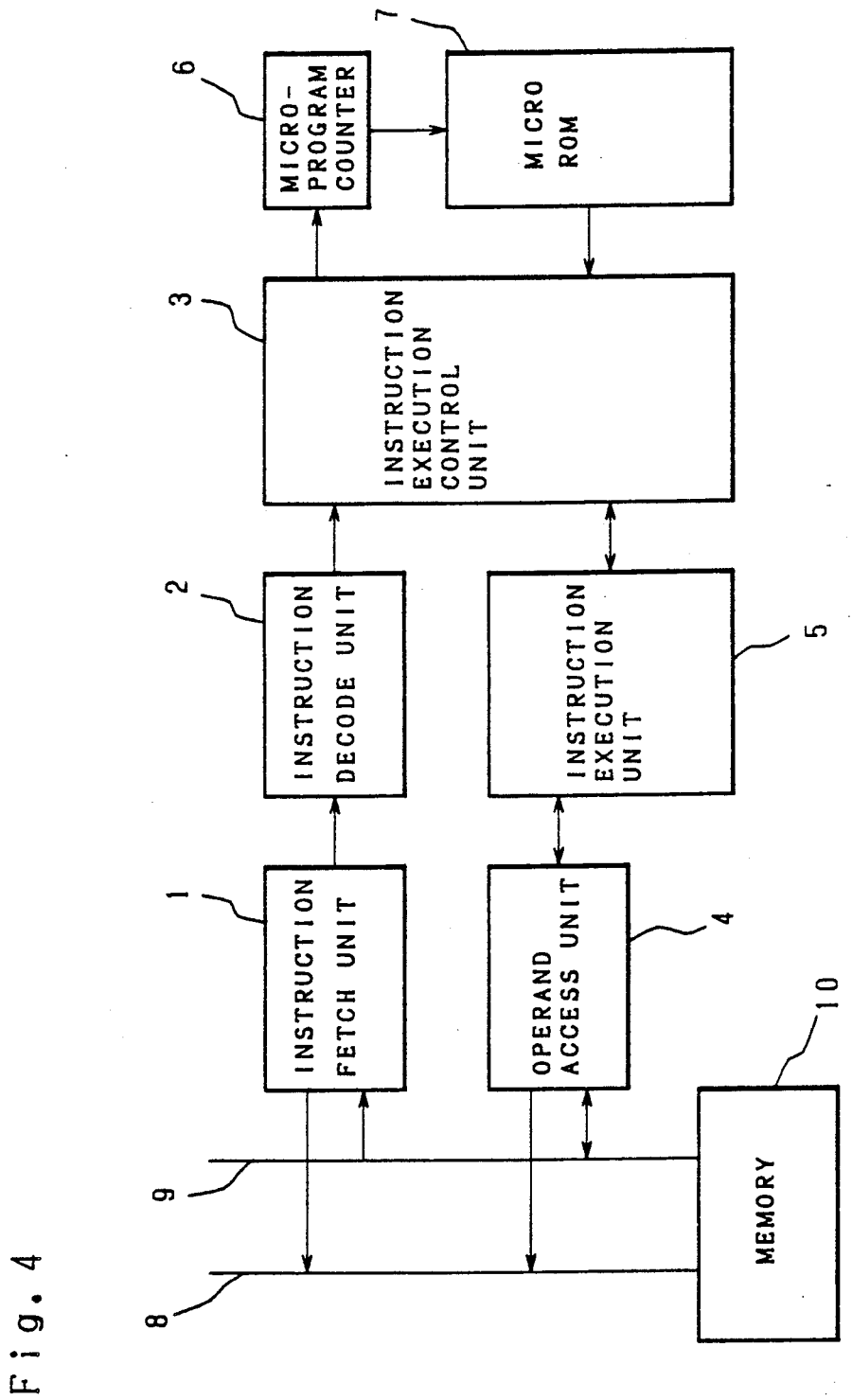
FIG. 4 is a block diagram showing the whole configuration of the data processor in accordance with the present invention.

FIG. 4 is a block diagram showing the whole configuration of a data processor in accordance with present invention.

In FIG. 4, numeral 1 designates an instruction fetch unit which sends addresses to a memory 10 through an address bus 8 and fetches instructions from the memory 10 through a data bus 9.

Numeral 2 designates an instruction decode unit which receives instructions from the instruction fetch unit 1, decodes it, and outputs information required for executing that instruction.

Numeral 3 designates an instruction execution control unit which outputs a microprogram entry address stored in a micro ROM 7 and showing the head address of a microprogram executing the instruction to a counter 6 based on the microprogram entry address or information such as general purpose register number, operand and data size outputted from the instruction decode unit 2, and controls an instruction execution unit 5 by a macro instruction outputted from the micro ROM 7 by addresses designated one after another by the microprogram counter 6 and by other information outputted from the instruction decode unit 2, and thereby executes an instruction.

Numeral 4 designates an operand access unit which, when an operand required in executing an instruction exists in a memory, outputs the address thereof to the address bus 8 and fetches or operand through the data bus 9, or when the operand is required to be stored in the memory, outputs that address to the address bus 8, and outputs the operand to the data bus 9.

Figure 5:
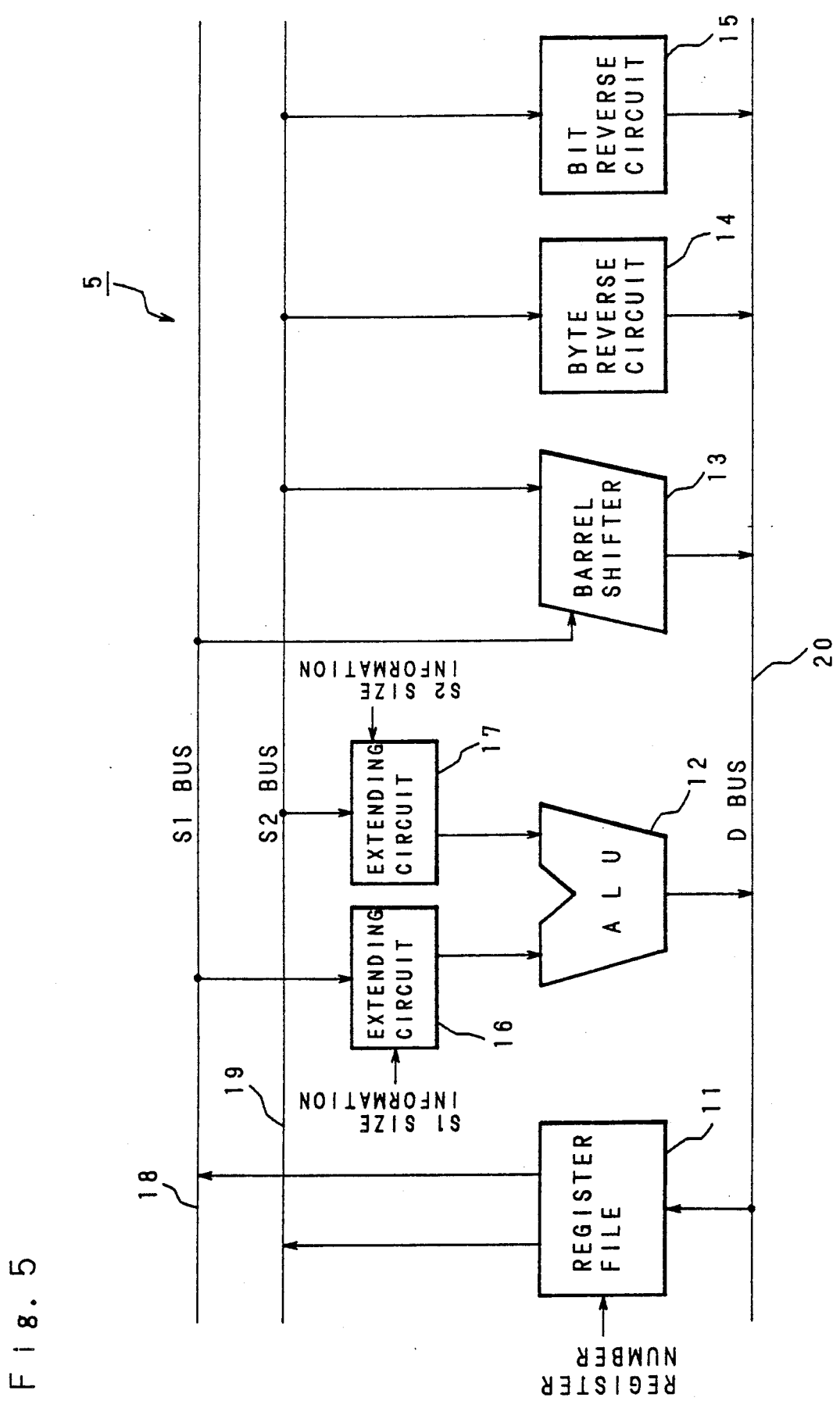
FIG. 5 is a block diagram showing a detailed configuration of an instruction execution unit thereof.

FIG. 5 is a block diagram showing the detail of the instruction execution unit 5 as shown in FIG. 4.

Numeral 11 designates a register file storing data as an operand.

Numerals 12, 13, 14 and 15 designate function units, respectively, In addition, numeral 12 designates an ALU executing arithmetic operation such as addition of two binary numbers and logical operation such as logical product of two bit strings.

Numerals 16 and 17 designate extension circuits which, when data having a data size smaller than that of the ALU 12 is inputted to the ALU, perform zero extension or code extension of the size thereof to the data size handled by the ALU 12.

Numeral 13 designates a barrel shifter for shifting data right or left by a plurality of bits by one operation.

Numeral 14 designates a byte reverse circuit for reversing the byte order of a byte string, and numeral 15 deginates a bit reverse circuit for reversing the bit order of a bit string.

Numeral 18, 19 and 20 designate buses which link the register file 11 to the function units 12, 13, 14 and 15, respectively.

The register 11 is linked in a 32-bit parallel fashion to the function units 12, 13, 14 and 15 such as the ALU 12 through the buses 18, 19 and 20. The bit store position of the register 11 and the input/output bit position of the ALU 12 are corresponding to one-to-one.

Figure 6:
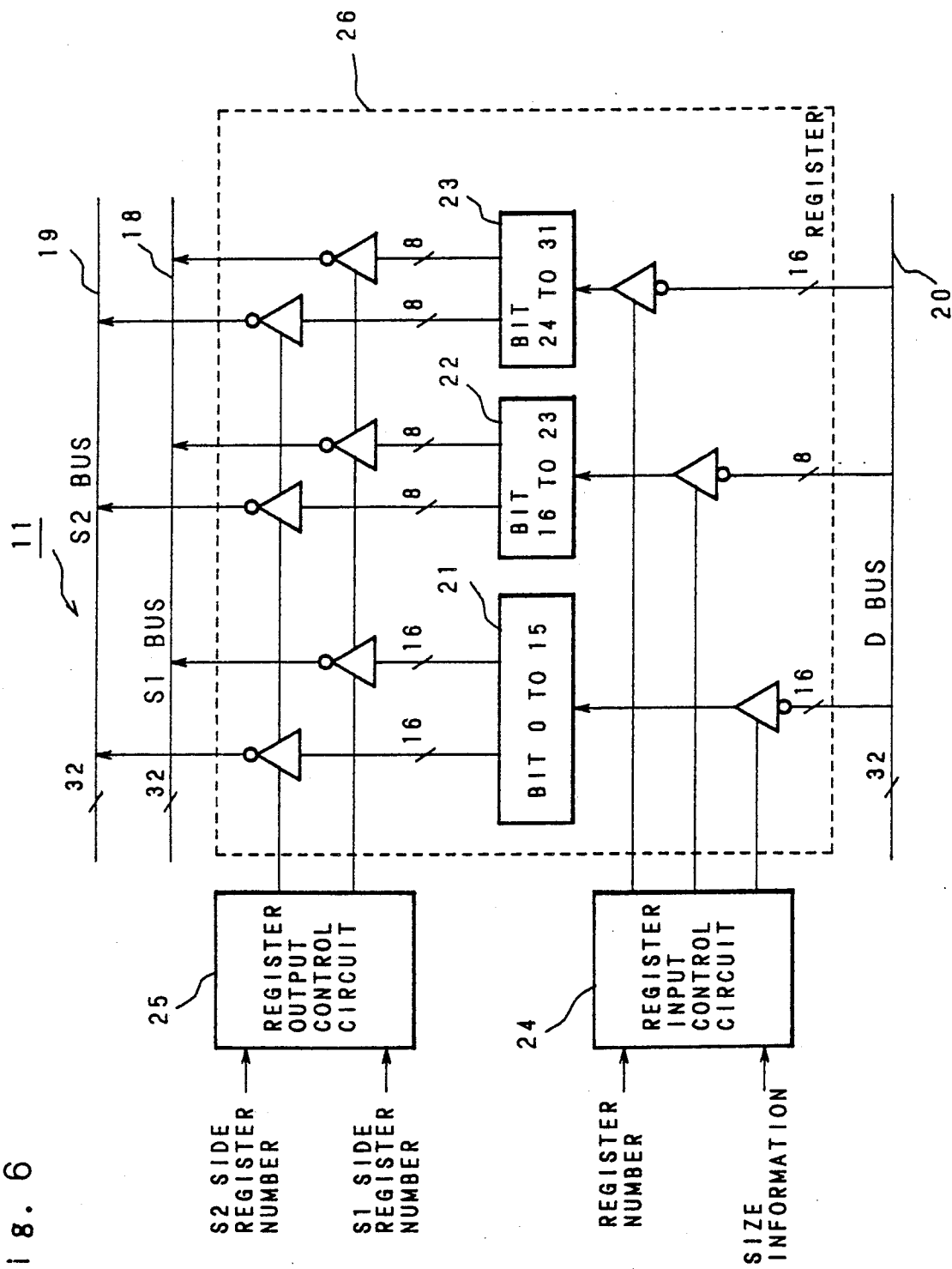
FIG. 6 is a block diagram showing a detailed configuration of a register file of the same.

FIG. 6 is a block diagram showing a detailed structure of the register file 11 as shown in FIG. 5.

Numerals 21, 22 and 23 designate circuits storing data of bit positions 0–15, 16–23 and 24–31 of the register, respectively.

Numeral 24 designates a register input control circuit which controls an input circuit of necessary data store position by the size of data to be inputted to the register file 11 and the register number of the register to be inputted, and thereby stores the data.

Numeral 25 designates a register output control circuit which inputs the register number of the register storing data to be outputted on each bus from the register file 11, and control outputting data in the register to thee S1 bus 18 and the S2 bus 19.

In addition, there are 32 portions designated by numeral 26 and encompassed by a broken line as shown in FIG. 6 in the register file 11, and the respective portions 26 can be discriminated as R0-R31 by the microprogram of the data processor in accordance with the present invention.

Figure 7:
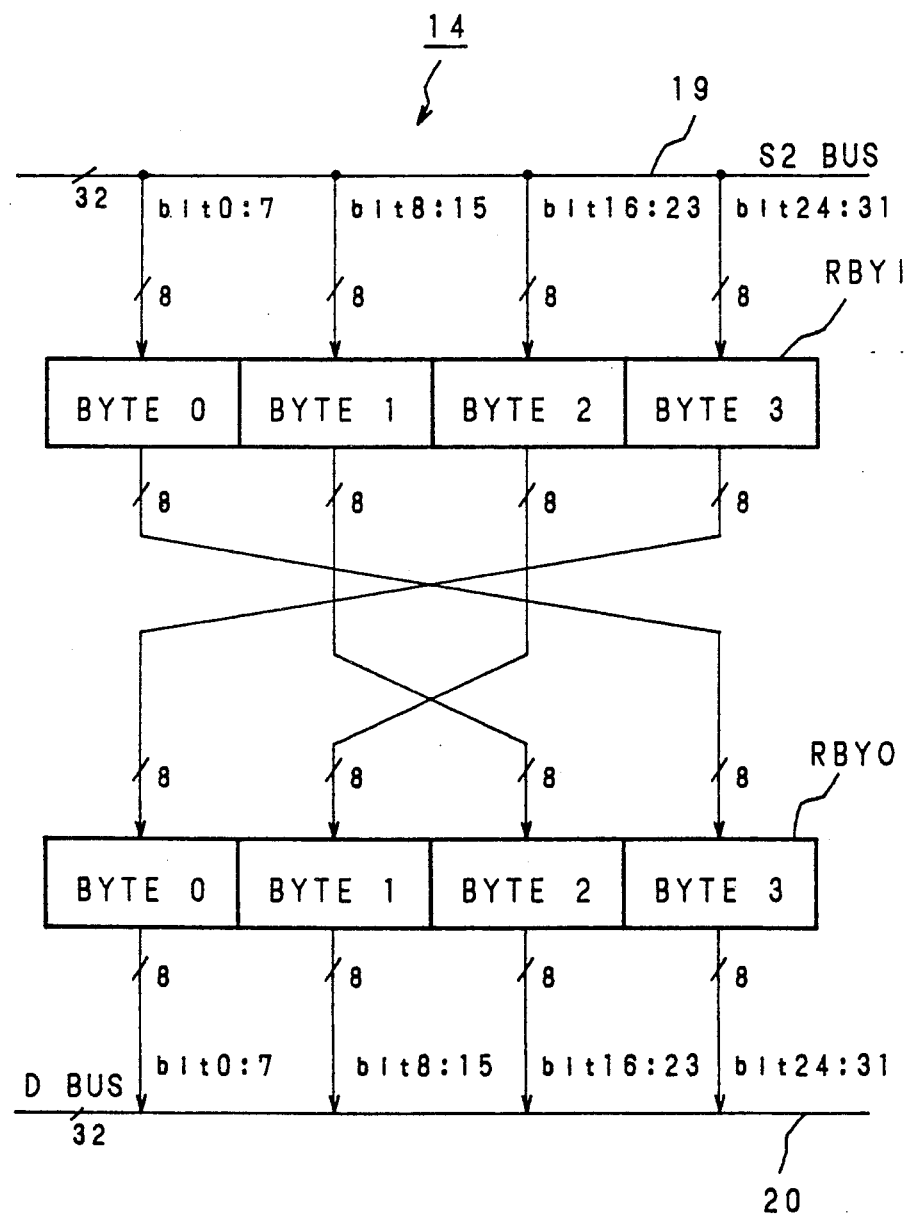
FIG. 7 is a block diagram showing a detailed configuration of a byte reverse circuit of the same.

FIG. 7 is a block diagram showing a detailed configuration of the byte reverse circuit 14 as shown in FIG. 5.

In this circuit, 4-byte data inputted from the S2 bus 19 is introduced into a BYI register RBYI, and the data whose byte order is reversed by wirings bundled and crossed by 8-line is transferred to a BYO register RBYO, and the value of the BYO register RBYO is outputted to the D bus 20.

Figure 8:
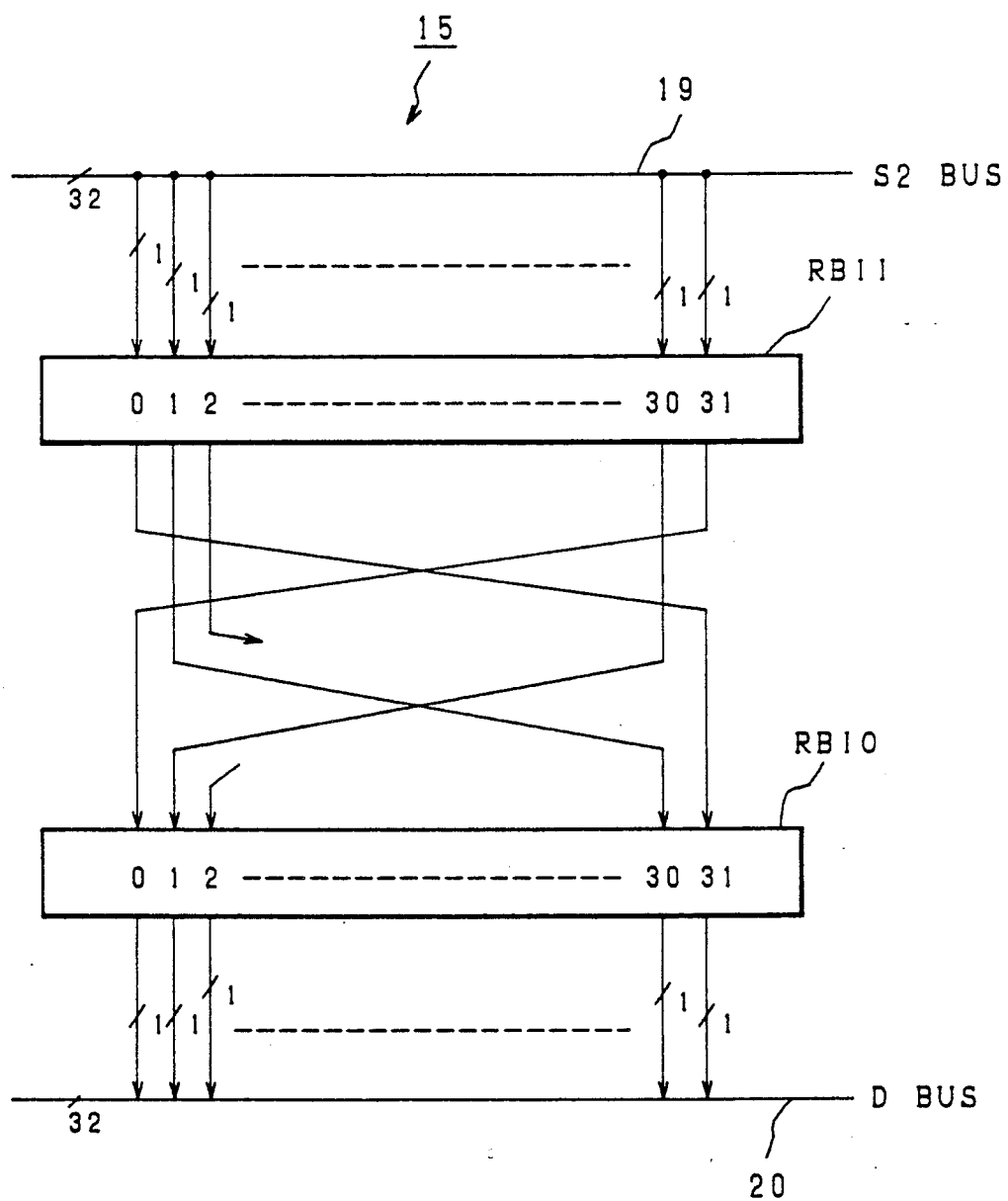
FIG. 8 is a block diagram showing a detailed configuration of a bit reverse circuit of the same.

FIG. 8 is a block diagram showing a detailed configuration of the bit reverse circuit 15 as shown in FIG. 5.

In this circuit, 4-byte data inputted from the S2 bus 19 is entered into a BII register RBII, and the data whose bit order is reversed by crossed wirings is transferred to a BIO register RBIO, and the value of the BIO register RBIO is outputted to the D bus 20.

Figure 3:
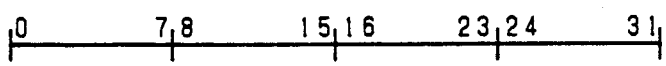
FIG. 3 is a schematic view showing the store position and the bit number of each data when data of 1 byte, 2 bytes and 4 bytes are stored in a register having a byte length of 4 bytes of a data processor in accordance with the present invention.
Figure 9:
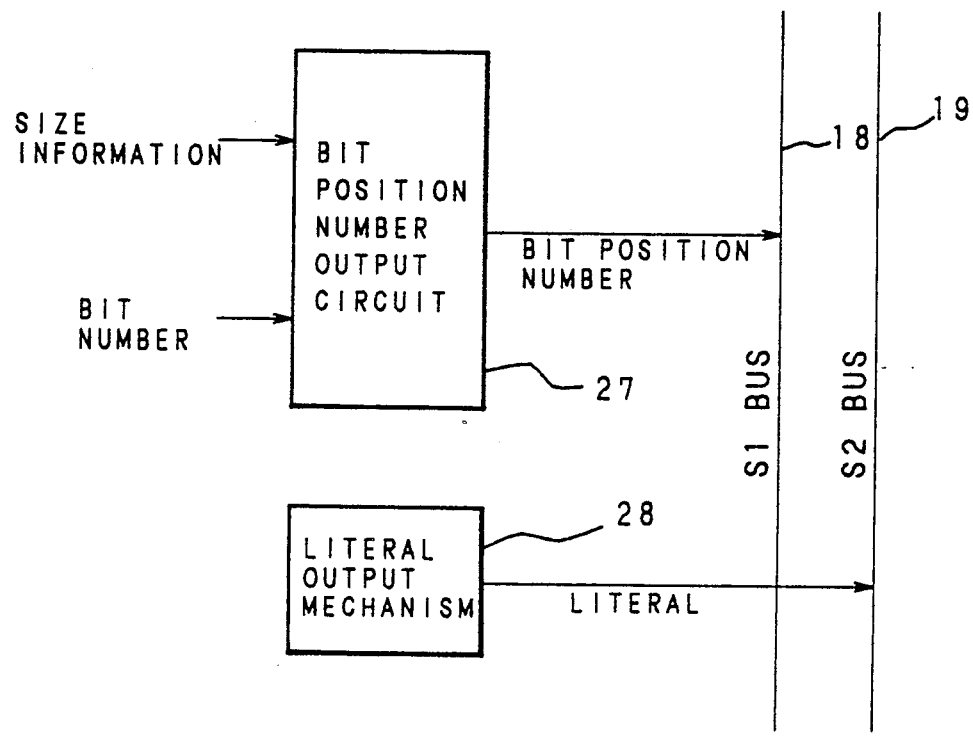
FIG. 9 is a block diagram showing a detailed configuration of part of an instruction execute control unit.

FIG. 9 is a block diagram showing a partial circuit included in an instruction execution control unit 3 as shown in FIG. 3.

Numeral 27 designates a bit position number output circuit outputting a number showing the bit position in a register to the S1 bus 18 based on size information and bit number of an operand designated by instruction. Also, numeral 28 designates a circuit outputting a constant 1 to the S2 bus 19, which outputs "1" to the least significant bit of the S2 bus 19 and outputs "0" to all the other bits.

Hereinafter, description is made on an operation of the data processor in accordance with the present invention.

Figure 10:
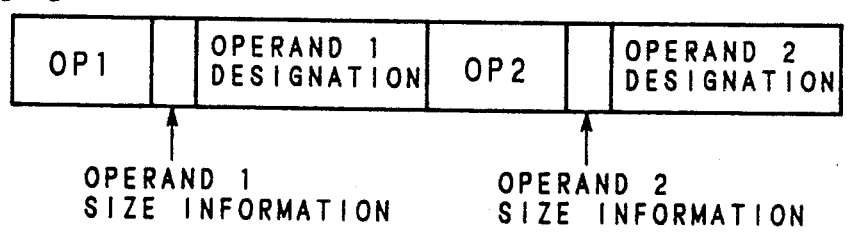
FIG. 10 is a schematic diagram of a bit pattern of a signed add instruction of the data processor in accordance with the present invention.

Description is made on the operation which executes arithmetic operation between operands having different sizes on the data processor of the present invention taking as an example the case of executing signed add instruction (in the data processor of the present invention, this is represented as "ADD R0. W R1, B", and the bit pattern of instruc- code thereof is as shown in FIG. 10) which adds signed binary number of 32 bits stored in a register R0 in the -register file 11 and a signed binary number of 8 bits stored in a register R1 and stores the result in the register R1 as a signed binary number of 8 bits.

An instruction is fetched from the memory 10 by the instruction fetch unit 1 as shown in FIG. 4, being decoded in the instruction decode unit 2, and the decoded result is given to the instruction execution control unit 3. The instruction execution control unit 3 sets an entry address of signed add program routine store in the micro ROM in the microprogram counter 6 taking two register addresses designating the register R0 and the register R1, the size of an operand stored in the register R0 and the size of an operand stored in the register R1 as parameters, reads a macro instruction, and executes the signed add instruction.

Figure 11:
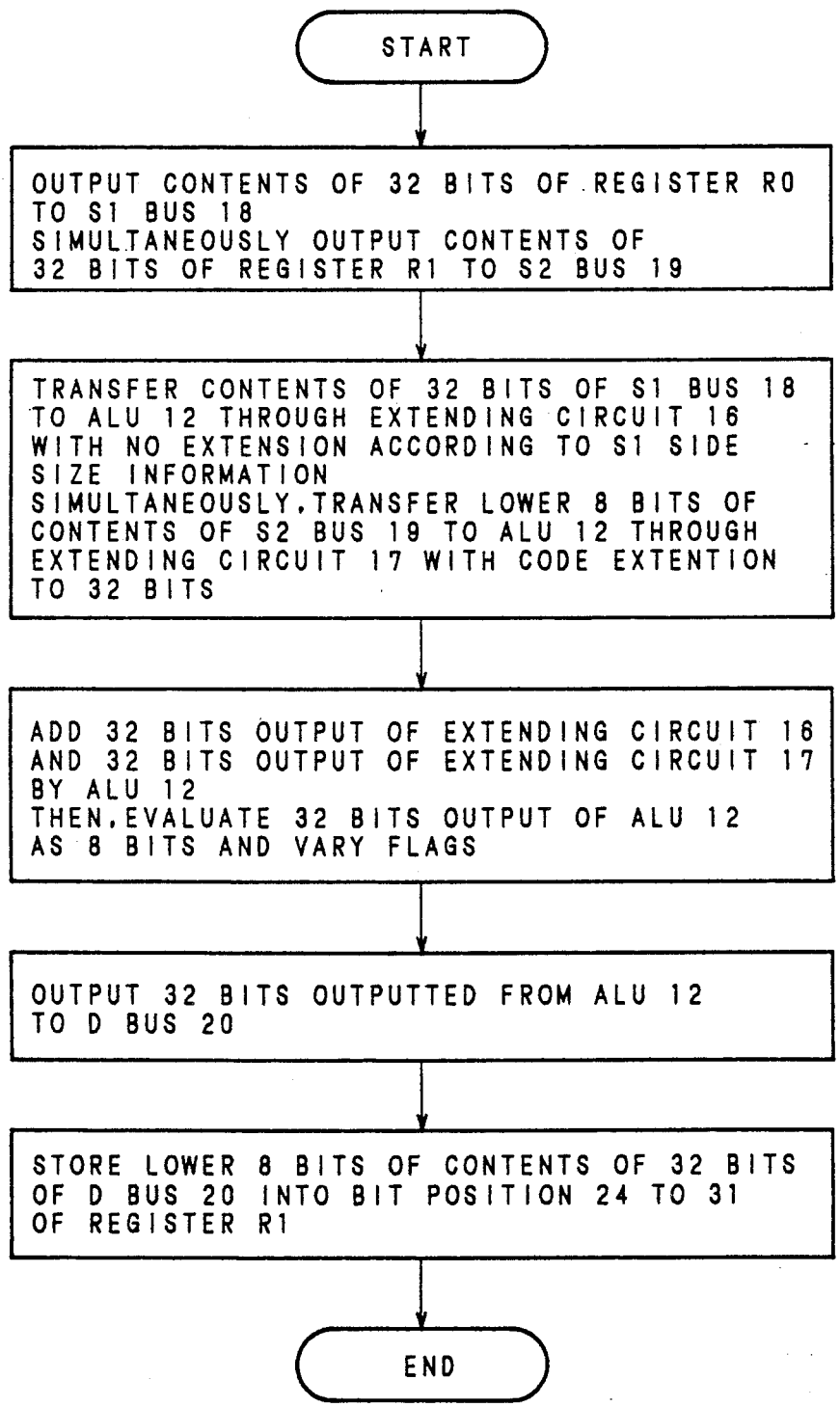
FIG. 11 is a flowchart showing a sequence of executing the signed add instruction by the data processor in accordance with the present invention.

FIG. 11 shows a flowchart showing an execution sequence of signed add instruction in the instruction execution control unit 3.

Two register numbers are inputted to the register output control circuit 25 (see FIG. 6) independent of the microprogram, and data in the register R0 is transferred to the ALU 12 through the S1 bus 18, and data in the register R1 is transferred to the ALU 12 through the S2 bus 19. At this time, all of 32 bits of the contents of the register R1 are outputted to the S2 bus 19, and low order 8 bits of the S2 bus 19 are code-extended by the extension circuit 17, being inputted tothe ALU 12. Also, the ALU 12 executes signed additionof two signed binary numbers of 32 bits, and outputs a signed binary number of 32 bits as a result of addition. At this time, the ALU 12 is indicated simultaneously that the register size to store the result of signed addition is 8 bits, and various control flags are set according to whether or not the result of addition can be expressed by a binary number of 8 bits or less, or to that the result of addition is positive, negative or zero.

32 bits of output of the ALU 12 are transferred to the register R1 through the D bus 20. Out of the 32-bit data transferred through the D bus 20, only the low order 8 bits are stored in the register R1 selected by the register input control circuit 24 at the bit positions 24–31 which are the low order-side 8 bits thereof.

Next, description will be given on the actual operation of the embodiment taking as an example a bit set instruction which sets "1" on a bit equivalent to the bit position 3 of the operand in the register R0.

Figure 12:
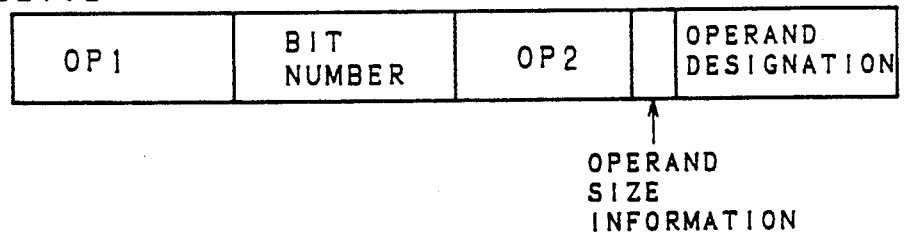
FIG. 12 is a schematic diagram showing a bit pattern of an instruction code of the data processor in accordance with the present invention.

In the data processor in accordance with the present invention, a bit pattern of instruction code of the bit set instruction is as shown in FIG. 12. Also, in the data proccessor of the present invention, the bit position in a register is as shown in FIG. 3, and therefore this bit set instruction is expressed "BSET #3 R0.B, BSET #11 R0.H or BSET #27 R0.W", respectively depending on that the size of an operand is 1 byte, 2 bytes or 4 bytes.

Figure 13:
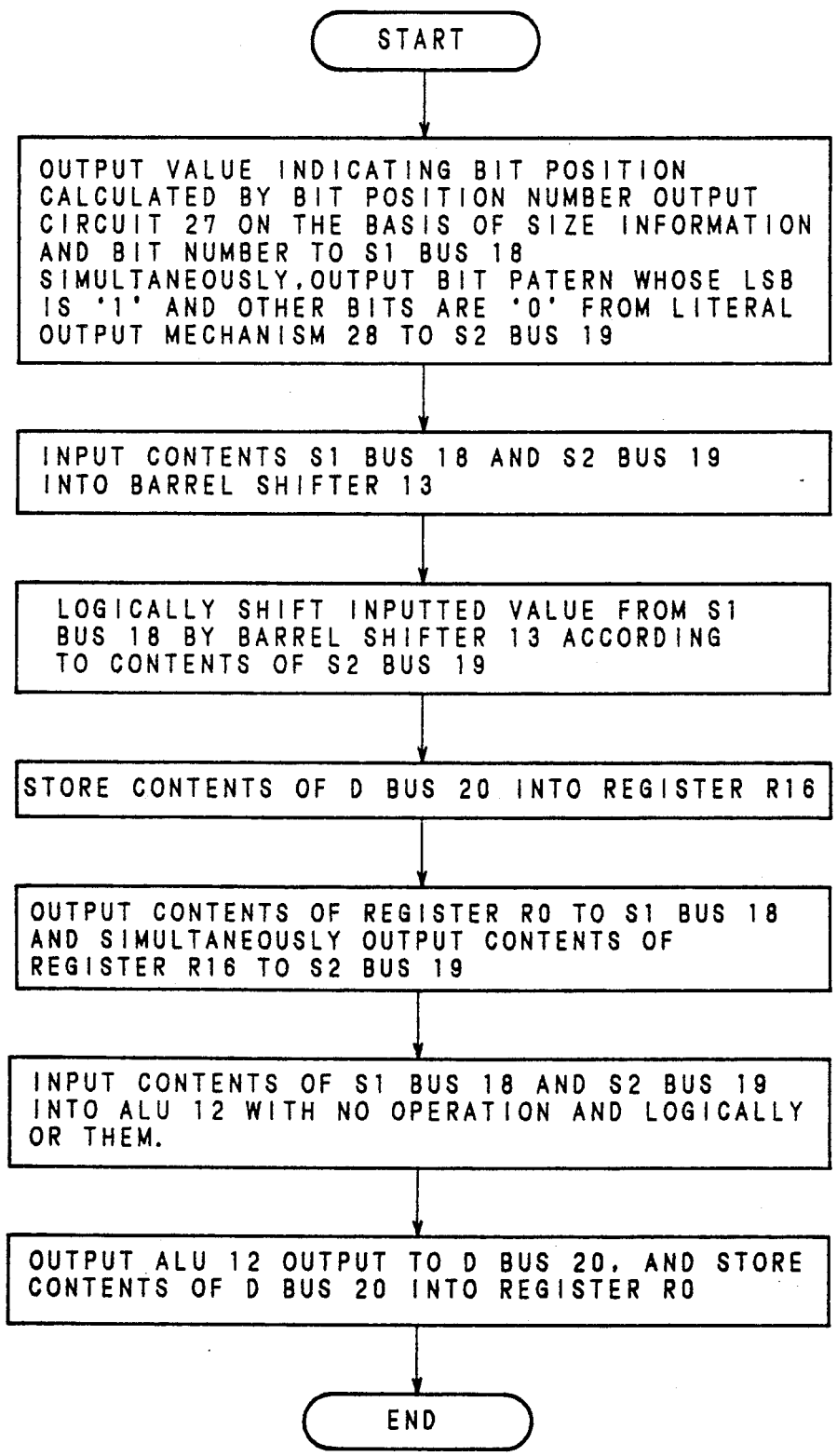
FIG. 13 is a flowchart showing a sequence of executing an bit set instruction by the data processor in accordance with the present invention.

FIG. 13 is a flowchart showing an execution sequence of the bit set instruction in the instruction execution control unit 3.

Figure 14:
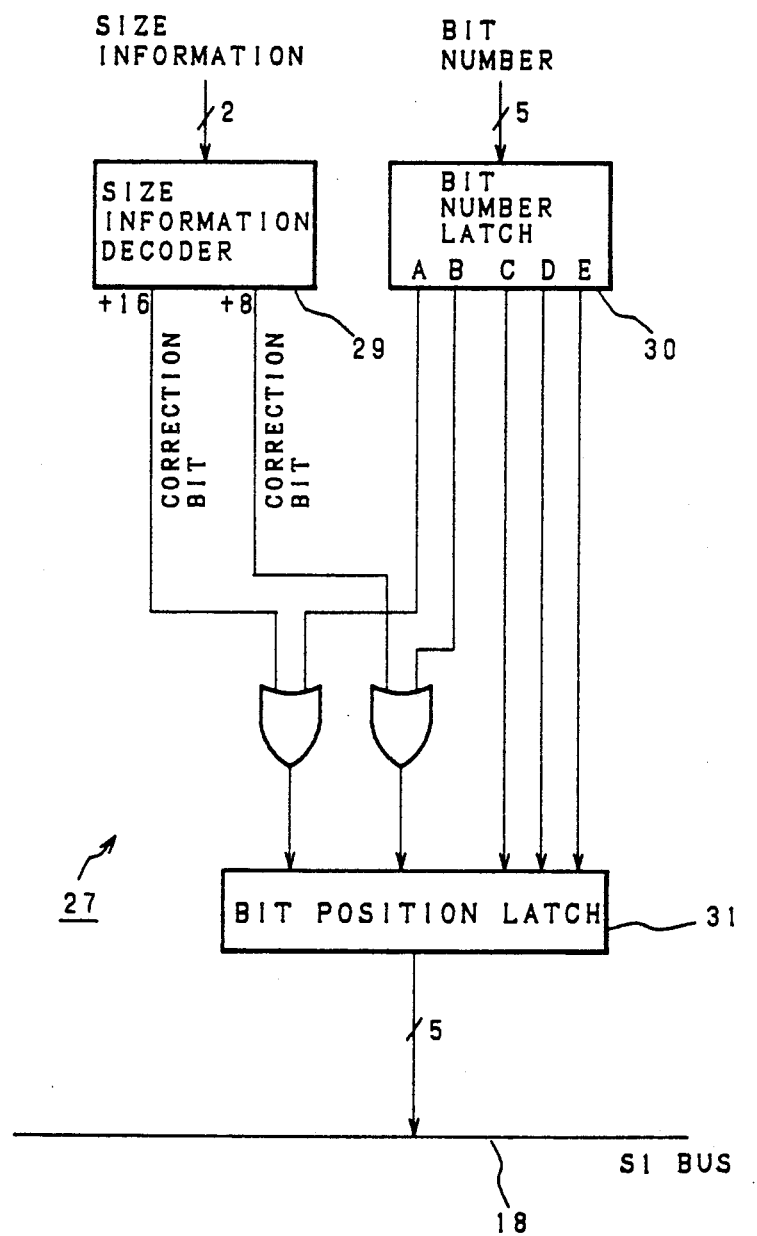
FIG. 14 is a circuit diagram showing a detailed configuration of a bit position number output circuit.

In the bit set instruction, the bit position number output circuit 27 as shown in detail in FIG. 14 is used to obtain the number designating the bit position of the register. In the instruction execution control unit 3, bit position number output circuit 27 introduces the size and bit number of the operand and outputs the bit position number to the S2 bus 19. The bit position number output circuit 27 outputs 27 (the bit number 3+24=27) to the S1 bus 18 when the data size information is 1 byte, outputting 27 (the bit number 11+16=27) to the S1 bus 18 when the data size information is 2 bytes. It outputs the bit number 27 intact to the S1 bus 18 when the data size information is 4 bytes.

The bit position number outputted from the bit position number output circuit 27 is inputted as shift number designation data of the barrel shifter 13 through the S1 bus 18. At this time, simultaneously a literal "1" is inputted to the barrel shifter 13 as a number to be shifted through the S2 bus 19. As a result, a 32-bit pattern wherein only the bit number 27 is "1" and all the other bits are "0" is outputted from the barrel shifter 13. This bit pattern is stored once in a register R16 as a working register. Subsequently, logical sum operation of the contents of the register R0 and the register R16 are executed in the ALU 12. At this time, the extension circuit 17 and the register input control circuit 24 operate depending on the byte length of the operand in the register R0 likewise the case of executing signed add instruction.

Next, the on operation of a byte reverse instruction which reverses the byte order of 32-bit data in the register R0 and transfer it to the register R1 will be described.

Figure 15:
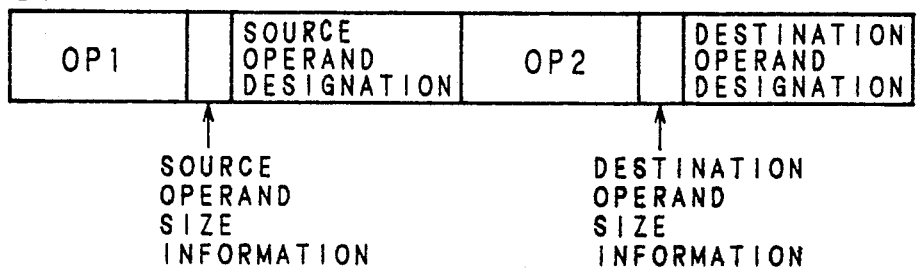
FIG. 15 is a schematic diagram showing a bit pattern of an instruction code of a byte reverse instruction of the data processor in accordance with the present invention.
Figure 16:
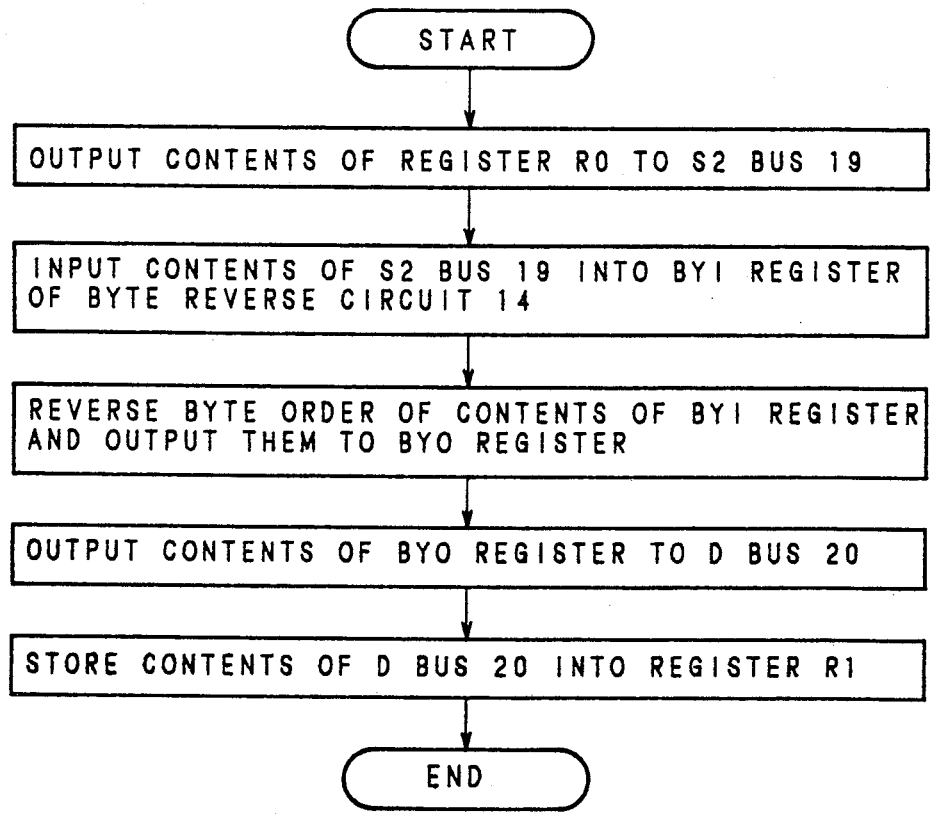
FIG. 16 is a flow chart showing a sequence of executing the byte reverse instruction by the data processor in accordance with the present invention.

FIG. 15 shows an instruction code bit pattern of the byte reverse instruction. FIG. 16 is a flowchart showing an execution sequence of the byte reverse instruction in the instruction execution control unit 3.

32-bit data in the register R0 is sent to the BYI register RBYI of the byte reverse circuit 14 through the S2 bus 19, and 32-bit data whose byte order is reversed is inputted ot the register R0 from the BYO register RBYO through the D bus 20.

Figure 17:
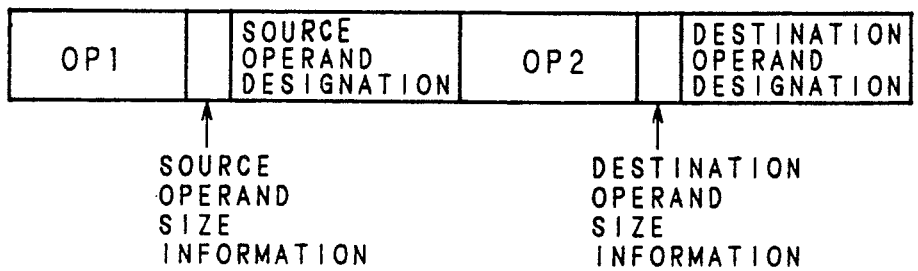
FIG. 17 is a schematic diagram showing a bit pattern of an instruction code of a bit reverse instruction of the data processor in accordance with the present invention.
Figure 18:
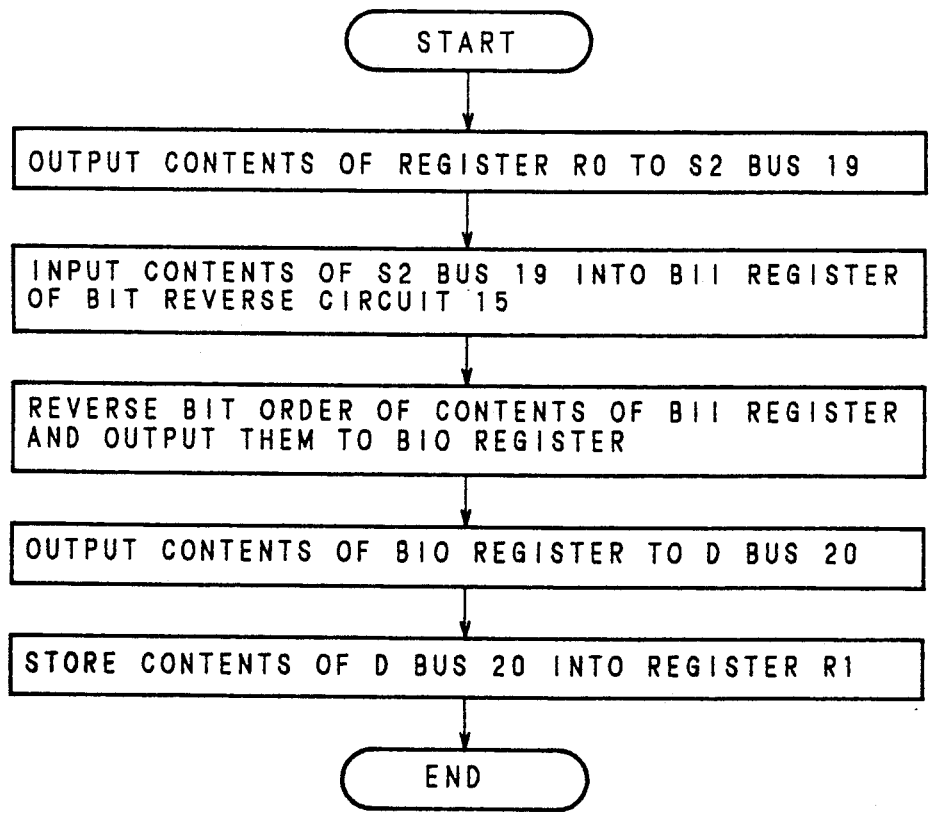
FIG. 18 is a flowchart showing a sequence of executing the bit reverse instruction by the data processor in accordance with the present invention.

Next, description will be given on operation of a bit reverse instruction which reverses the bit order of 32-bit data in the register R0 and transfer it to the register R1. FIG. 17 shows an instruction code bit pattern of the bit reverse instruction. FIG. 18 is a flowchart showing an execution sequence of the bit reverse instruction in the instruction xecution control unit 3.

32-bit data in the register R0 is sent to the BII register RBII of the bit reverse circuit 15 through the S2 bus 19, and the 32-bit data whose bit order is reversed is inputted to the register R0 from the BIO register RBIO through the D bus 20.

In the above-mentioned embodiment, an example is shown wherein the bit position number in the register is obtained using hardware, but the bit position may be obtained in a manner that a microprogram is provided separately for each byte length of operand, and the bit number is corrected by the microprogram.

Also, in the above-mentioned embodiment, the operational function between operands having different sizes taking the signed add instruction between operands in the register as an example is described, but the arithmetic operation between operands having different sizes can be executed for all of four operations; addition, subtraction, multiplication and division by a similar method.

Also, in the above-mentioned embodiment, the byte reverse instruction and the bit reverse instruction only in the case of 32-bit data is described, but by combining arithmetic operation in the byte reverse circuit 14 or the bit reverse circuit 15 of the above-mentioned embodiment with arithmetic operation in the barrel shifter 13, the byte reverse instruction or the bit reverse instruction can be executed for other size data by microprograms. Also, a similar effect is obtainable by executing these two instructions by microprograms using only the ALU 12 or the barrel shifter 13 and working register.

As described above, in the data processor in accordance with the present invention, a high-performance and low-priced data processor can be realized wherein data having a byte length shorter than the byte length of a register is stored in the register in a manner that the byte polarity and the bit polarity are set to big endian intact and the least significant bit thereof is coincided with that of data in the other register having the same byte length as the byte length of the register, thereby arithmetic operation can be executed between two binary numbers having different data sizes stored in two registers without arithmetically shifting either of the two data.

Furthermore, by providing the instruction for reversing the byte order of data and the instruction for reversing the bit order thereof, data having formats of different byte polarities and different bit polarities can also be easily handled without imposing a burden on software, thereby a data processor capable of reducing the cost for developing software can be realized.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meet and bounds of the claims, or equivalence of such meets and bounds thereof are therefore intended to be embraced by the claims.

What is claimed is:

1. A data processor comprising:
a decoding mechanism which decodes an instruction, which includes an op code specifying a byte order reversal operation and outputs byte order reversal control information;
a first register which stores data consisting of a plurality of connected bytes; and
a function unit, coupled to said first register and said decoding mechanism, which executes said byte order reversal operation, according to said byte order reversal control information, on said data stored in said first register and stores resulting byte order reversed data in said first register.

2. A data processor comprising:
a decoding mechanism which decodes an instruction, which includes an op code specifying a bit order reversal operation and outputs bit order reversal control information;
a first register which stores data consisting of a plurality of connected bits; and
a function unit, coupled to said first register and said decoding mechanism, which executes said bit order reversal operation, according to said bit order reversal control information, on said data stored in said first register and stores resulting bit order reversed data in said first register.

3. A data processor comprising:
a decoding mechanism which decodes a first type of instruction, which includes an op code specifying a bit order reversal operation to output bit order reversal control information and which decodes a second type of instruction, which includes an op code specifying a byte order reversal operation, to output byte order reversal control information;
a first register which stores data consisting of a plurality of connected bits; and
a function unit, coupled to said first register and said decoding mechanism, which executes said bit order reversal operation, according to said bit order reversal control information, on said data stored in said first register and stores resulting bit order reversed data in said first register and which executes said byte order reversal operation, according to said byte order reversal control information, on said data stored in said first register and stores resulting byte order reversed data in said first register.

4. In a data processor including first and second N byte registers, having least significant and most significant byte and bit storage locations, a processing unit for processing data transferred from said registers, a method for storing and transferring data to and from said registers comprising the steps of:
storing an M byte first data element in said first register and an L byte second data element in said second register, where L and M may have different values and are less than or equal to N, with the least significant bit of each of said first and second data elements stored in the least significant bit storage location of each respective register, with each register having least significant and most significant byte and bit storage locations, with each bit storage location in the register identified by one of 8N bit position numbers and each byte storage location identified by one of N byte position numbers, with the bit position number 8N identifying the least significant bit storage location and with the byte position number N identifying the least significant byte storage location;
directly transferring, without shifting, said first and second stored data elements to said processing unit with the least significant bits of said first and second transferred data elements being aligned to facilitate direct processing of said data elements without the requirement of shifting or reordering the bits of said data elements regardless of whether L and M are the same.

5. A data processor comprising:
a decoding mechanism which decodes an instruction, which includes an op code specifying a byte order reversal operation and outputs byte order reversal control information;
a first register which stores data consisting of a plurality of connected bytes;
a function unit, coupled to said first register and said decoding mechanism, which executes said byte order reversal operation, according to said control information, on said data stored in said first register and stores resulting byte reversed data in said first register; and
a second register and where said byte reversed data is stored in said second register by said functional unit.

6. A data processor comprising:
a decoding mechanism which decodes an instruction, which includes an op code specifying a bit order reversal operation and outputs bit order reversal control information;
a first register which stores data consisting of a plurality of connected bits;
a function unit, coupled to said first register and said decoding mechanism, which executes said bit order reversal operation, according to said control information, on said data stored in said first register and stores resulting bit reversed data in said first register; and
a second register and where said bit reversed data is stored in said second register by said functional unit.

7. A data processor comprising:
a decoding mechanism which decodes a first type of instruction, which includes an op code specifying a bit order reversal operation to output bit order reversal control information and which decodes a second type of instruction, which includes an op code specifying a byte order reversal operation, to output byte order reversal control information;
a first register which stores data consisting of a plurality of connected bits;
a function unit, coupled to said first register and said decoding mechanism, which executes said bit order reversal operation, according to said bit order reversal control information, on said data stored in said first register and stores resulting bit reversed data in said first register and which executes said byte reversal operation, according to said byte order reversal control information, on said data stored in said first register and stores resulting byte reversed data in said first register; and
a second register and where said bit reversed or byte reversed data is stored in said second register by said functional unit.

8. The data processor of claim 7 where said instruction includes an operation designation which is decoded by said instruction decoding mechanism to provide an operation indication specifying an operation to be performed on the bit specified by said bit number indication and further comprising:
logic means, that receive said determined register bit position number, for generating and storing a logical data element having all bits equal to a same value except the bit indicated by said bit number indication, where said data element stored in said register and said logical data element are processed to effect said specified operation on the specified bit number of said operand.

9. The method of claim 4 further comprising a method for performing a bit operation on data stored in said first register comrising the steps of:
providing an instruction including operand size information specifying the number of bytes in a first word stored in said first register and a bit number specifying the displacement, from the leftmost bit of said first word, of the bit to be operated on;
processing said operand size information and said bit number information to determine the bit position number of the bit storge location of said first register where the bit to be operated on is stored.

10. The method of claim 4 wherein said step of storing comprises the steps of:

reversing the byte order of a selected data word to be stored that does not have a least significant byte as the rightmost byte so that the least significant byte of said selected data word is stored in the least significant byte location of said first register.

11. The method of claim 4 wherein said step of storing comprises the steps of:

reversing the bit order of the bits in a selected data word to be stored that does not have a least significant bit as the rightmost bit of said selected data word so that the least significant bit of said selected data word is stored in the least significant bit location of said first register.

12. In a data processor including first and second N byte registers, with each register having least significant and most significant byte and bit storage locations, with each bit storage location in the register identified by one of 8N bit position numbers and each byte storage location identified by one of N byte position numbers, with the bit position number 8N identifying the least significant bit storage location and with byte position number N identifying the least significant byte storage location and with the data processor also including a processing unit for processing data transferred from said registers, a system for storing and transferring data to and from said registers comprising:

means for storing an M byte first data element in said first register and an L byte second data element in said second register, where L and M may have different values and are less than or equal to N, with the least significant bit of each of said first and second data elements stored in the least significant bit storage location of each respective register; and means for directly transferring, without shifting, said first and second stored data elements to said processing unit with the least significant bits of said first and second transferred data elements being aligned to facilitate direct arithmetic processing of said data elements without the requirement of shifting or reordering the bits of said data elements regardless of whether L and M are the same.

13. The system of claim 12 further comprising a system for performing a bit operation on data stored in said first register by executing a bit instruction including operand size information specifying the number of bytes in a first word stored in said first register and a bit number specifying the displacement from a leftmost boundary bit of said first word of the bit to be operated on, said system comprising:

means for processing said operand size information and said bit number information to determine the bit position number of the bit storage location of said first register where the bit to be operated on is stored.

14. The system of claim 12 wherein said means for storing comprises:

a byte reverse circuit for reversing the byte order of a selected data word that does not have a least significant byte as the rightmost byte to store the least significant byte of said selected data word in the least significant byte location of said first register.

15. The system of claim 12 wherein said means for storing comprises:

a bit reverse circuit for reversing the bit order of a selected data word that does not have a least significant bit as the rightmost bit of selected data word so that the least significant bit of said selected data word is stored in the least significant bit location of said first register.

16. In a data processor including a first N byte register, having least significant and most significant byte and bit storage locations, and a processing unit for processing data transferred from said register, a method for storing and transferring data to and from said register and for performing a bit operation on data stored in said first register comprising the steps of:

storing an M byte first data element in said first register where M is less than or equal to N, with the least significant bit of said first data element stored in the least significant bit storage location of said first register, with said first register having least significant and most significant byte and bit storage locations, with each bit storage location in the register identified by one of 8N bit position numbers and each byte storage location identified by one of N byte position numbers, with the bit position number 8N identifying the least significant bit storage location and with the byte position number N identifying the least significant byte storage location;

directly transferring, without shifting, said first stored data element to said processing unit with the least significant bits of said first transferred data element being aligned to facilitate direct processing of said data element without the requirement of shifting or reordering the bits of said data element;

providing and instruction including operand size information specifying the number of bytes in a first word stored in said first register and a bit number specifying the displacement, from the leftmost bit of said first word, of the bit to be operated on;

processing said operand size information and said bit number information to determine the bit position number of the bit storage location of said first register where the bit to be operated on is stored.

17. In a data processor including a first N byte register, with said first register having least significant and most significant byte and bit storage locations, with each bit storage location in the register identified by one of 8N position numbers and each byte storage location identified by one of N byte position numbers, with the bit position number 8N identifying the least significant bit storage location and with byte position number N identifying the least significant byte storage location and with the data processor also including a processing unit for processing data transferred from said registers, a system for storing and transferring data to and from said register and for performing a bit operation on data stored in said first register by executing a bit instruction including operand size information specifying the number of bytes in a first word stored in said first register and a bit number specifying the displacement from a leftmost boundary bit of said first word of the bit to be operated on, said system comprising:

means for storing an M byte first data element in said first register, where M is less than or equal to N, with the least significant bit of each of said first data element stored in the least significant bit storage location of said first register;

means for directly transferring, without shifting, said first stored data element to said processing unit with the least significant bits of said first transferred data element being aligned to facilitate direct arithmetic processing of said data element without the requirement of shifting or reordering the bits of said data element; and means for processing said operand size information and said bit number information to determine the bit position number of the bit storage location of said first register where the bit to be operated on is stored.

18. In a data processor including a first N byte register, having least significant and most significant byte and bit storage locations, and a processing unit for processing data transferred from said register, method for storing and transferring data to and from said register comprising the steps of:

storing an M byte first data element in said first register and M is less than or equal to N, with the least significant bit of said first data element stored in the least significant bit storage location of said first register, with said first register having least significant and most significant byte and bit storage locations, with each bit storage location in the register identified by one of 8N bit position numbers and each byte storage location identified by one of N byte position numbers, with the bit position number 8N identifying the least significant bit storage location and with the byte position number N identifying the least significant byte storage location;

directly transferring, without shifting, said first stored data element to said processing unit with the least significant bits of said first transferred data element being aligned to facilitate direct processing of said data element without the requirement of shifting or reordering the bits of said data element; and reversing the byte order of a selected data word to be stored that does not have a least significant byte as the rightmost byte so that the least significant byte of said selected data word is stored in the least significant byte location of said first register.

19. In a data processor including a first N byte register, with said first register having least significant and most significant byte and bit storage locations, with each bit storage location in the register identified by one of 8N bit position numbers and each byte storage location identified by one of N byte position numbers, with the bit position number 8N identifying the least significant bit storage location and with byte position number N identifying the least significant byte storage location and with the data processor also including a processing unit for processing data transferred from said registers, a system for storing and transferring data to and from said register, said system comprising:

means for storing an M byte first data element in said first register, where M is less than or equal to N, with the least significant bit of each of said first data element stored in the least significant bit storage location of said first register;

means for directly transferring, without shifting, said first stored data element to said processing unit with the least significant bits of said first transferred data element being aligned to facilitate direct arithmetic processing of said data element without the requirement of shifting or reordering the bits of said data elements; and a byte reverse circuit for reversing the byte order of a selected data word not having the having a least significant byte as the rightmost byte to store the least significant byte of said selected data word in the least significant byte location of said first register.

20. In a data processor including a first N byte register, having least significant and most significant byte and bit storage locations, and a processing unit for processing data transferred from said register, a method for storing and transferring data to and from said register comprising the steps of:

storing an M byte first data element in said first register and M is less than or equal to N, with the least significant bit of said first data element stored in the least significant bit storage location of said first register, with said first register having least significant and most significant byte and bit storage locations, with each bit storage location in the register identified by one of 8N bit position numbers and each byte storage location identified by one of N byte position numbers, with the bit position number 8N identifying the least significant bit storage location and with the byte position number N identifying the least significant byte storage location;

directly transferring, without shifting, said first stored data element to said processing unit with the least significant bits of said first transferred data element being aligned to facilitate direct processing of said data element without the requirement of shifting or reordering the bits of said data element;

reversing the bit order of the bits in a selected data word to be stored that does not have a least significant bit as the rightmost bit of said selected data word so that the least significant bit of said selected data word is stored in the least significant bit location of said first register.

21. In a data processor including a first N byte register, with said first register having least significant and most significant byte and bit storage locations, with each bit storage location in the register identified by one of 8N bit position numbers and each byte storage location identified by one of N byte position numbers, with the bit position number 8N identifying the least significant bit storage location and with byte position number N identifying the least significant byte storage location and with the data processor also including a processing unit for processing data transferred from said registers, a system for storing and transferring data to and from said register, said system comprising:

means for storing an M byte first data element in said first register, where M is less than or equal to N, with the least significant bit of each of said first data element stored in the least significant bit storage location of said first register;

means for directly transferring, without shifting, said first stored data element to said processing unit with the least significant bits of said first transferred data element being aligned to facilitate direct arithmetic processing of said data element without the requirement of shifting or reordering the bits of said data element; and a bit reverse circuit for reversing the bit order of a selected data word that does not have a least significant bit as the rightmost bit of selected data word so that the least significant bit of said selected data word is stored in the least significant bit location of said first register.

* * * * *